United States Patent [19]
Kauffman

[11] Patent Number: 5,485,944
[45] Date of Patent: Jan. 23, 1996

[54] PORTABLE WRITING PLATFORM FOR VEHICLES

[76] Inventor: Robert C. Kauffman, 342 Windemere Ave., Lansdowne, Pa. 19050

[21] Appl. No.: 214,536

[22] Filed: Mar. 18, 1994

[51] Int. Cl.⁶ ............................................. B60R 7/00
[52] U.S. Cl. ..................... 224/277; 108/44; 224/901; 248/441.1
[58] Field of Search ................. 248/441.1; 224/277, 224/273, 901; 281/45; 108/44, 45

[56] References Cited

U.S. PATENT DOCUMENTS

| | | | |
|---|---|---|---|
| D. 199,241 | 9/1964 | Patterson | D14/30 |
| D. 226,040 | 1/1973 | Beerli | D24/2 |
| 4,053,133 | 10/1977 | Kauffman | 248/452 |
| 5,180,133 | 1/1993 | Chang | 248/441.1 X |
| 5,190,317 | 3/1993 | Zoland | 281/45 X |
| 5,294,032 | 3/1994 | Hagglund | 224/277 |
| 5,324,076 | 6/1994 | Nieradka | 248/441.1 X |

Primary Examiner—Ramon O. Ramirez

[57] ABSTRACT

A note pad holder to be used in motor vehicles. The note pad having a base, a spring clamp for securing a note pad and a clip for holding a writing utensil. The base is removable secured to a vehicle dashboard such that pressure on the writing surface of the base will cause the base to pivot from a first position substantially parallel to the dashboard to a second position wedged between the dashboard and the windshield.

5 Claims, 3 Drawing Sheets

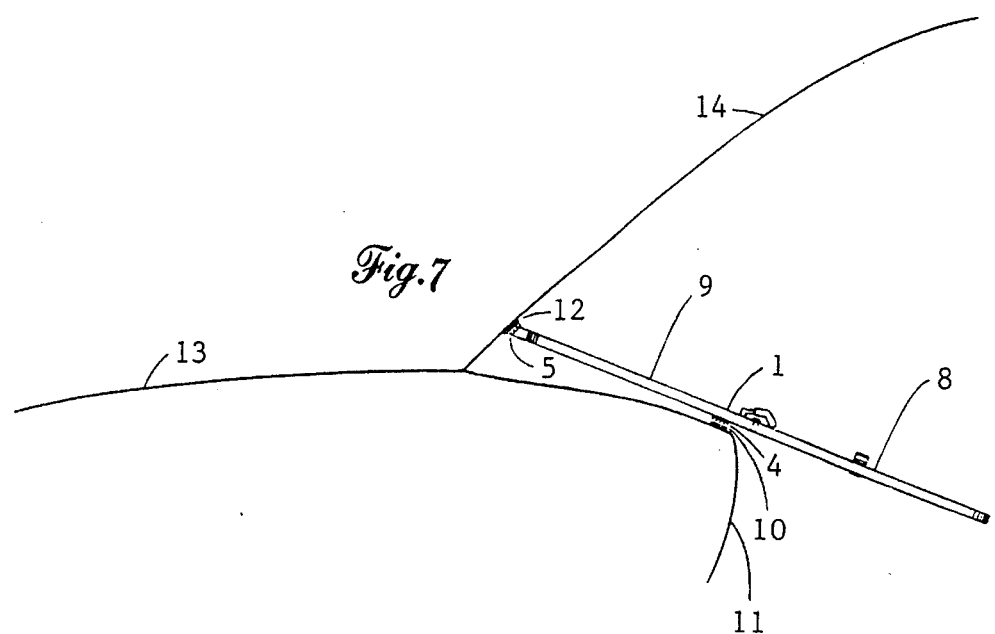
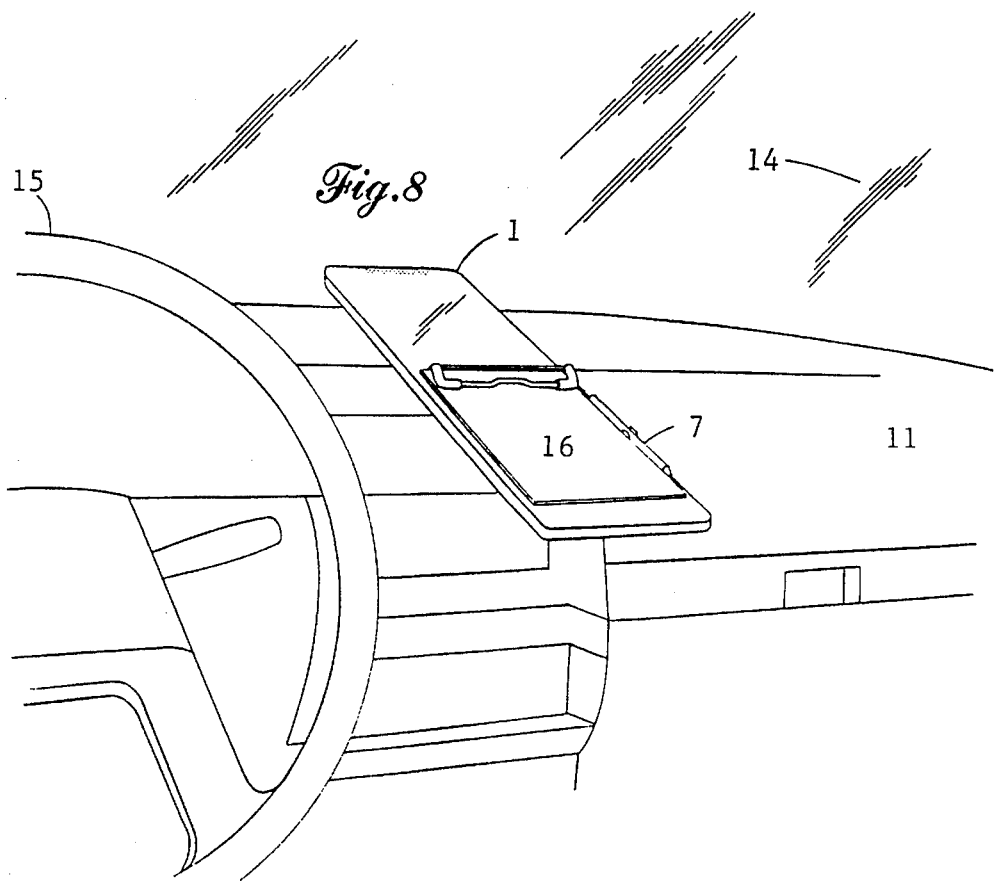

PORTABLE WRITING PLATFORM FOR VEHICLES

BACKGROUND OF INVENTION

This invention relates to a portable writing platform capable of universal installation in a vehicle. Operators of automobiles have occasion to refer to notes or to write memos during travel. Safety would indicate pulling over to a rest stop or other availability to take notes or make references. The writing platform is positioned not to obstruct any view of the road that would endanger the vehicle and passenger. The top edge of the writing platform will abut within a narrow margin of the lower inner windshield surface, thereby insuring full view of the road and operating the vehicle safely. The writing platform includes means of holding pen/pencil ready for use. The immediate availability for note taking affords more concentration on driving, rather than trying to remember details at the end of one's trip.

DESCRIPTION OF PRIOR ART

Quite a few portable writing platform concepts for vehicles have been attempted. Two writing platforms were mounted on the steering wheel. I refer to U.S. Pat. No. D 226,040 to Beerli (1973) which may present a dangerous steering condition, as well as blocking use of horn. The safest way of using Beerli's clipboard attachment for a steering wheel is when the vehicle is parked. The clipboard may be positioned on steering wheel of vehicle to be used, then removed when vehicle is to be driven.

Steering wheel desk, U.S. Pat. No. D 199,241 to Patterson (1964) presents a disadvantage. In the event of a collision, much of the metal hardware that comprises the structure is directly in front of the driver that could come in contact with his head, face and chest.

I have designed and made many writing platforms, one of which I patented, U.S. Pat. No. 4,053,133 to Kauffman (1977). Unfortunately, it was too intricate to be practical and profitable. The biggest challenge was to create a portable writing platform to fit all configurations in any vehicle and remain a simple structure that would put a paper pad in close proximity to operator of vehicle.

U.S. Pat. No. 5,294,032 to Hagglund (1994) Notepad Holder for Automobile is a hanging notepad holder whose sole support is from a point of inner surface of windshield of vehicle. Hagglund's notepad holder as well as FIG. 1A (prior art) are both hanging by attachments without fixed support at base.

The BACK, MIDSECTION of my writing platform makes double contact with dashboard and affixed hook/loop fasteners that control any lateral movement. My writing platform lies across support with on projecting extention. The contact of top edge of NECK with strip loop fastener affixed on my writing platform to inner surface of windshield with strip hook fastener affixed, serves as an abutment and not a support.

Hagglund's note pad holder is difficult to reach as most vehicle windshield's lower portion are more than an arms length from operator of vehicle, especially when the operator is in the proper seated driving position. Hagglund's notepad holder hangs from the inner surface of windshield which is hard to reach in an effort to take notes and difficult to read for most people at that range. My portable writing platform extends much further down, past distance of dashboard edge, continuing down in close proximity to operator of vehicle.

The structure and function of my portable writing platform is different from Hagglund's Notepad Holder for Automobile, U.S. Pat. No. 5,294,032 (1994) and FIG. 1A (prior art).

In the interest of easier reading, portable writing platform will also be referred to as writing platform or platform.

SUMMARY OF THE INVENTION

Accordingly, besides the object and advantages of writing platform described in my patent application, several objects and advantages of present invention are:

(a) to fit every vehicle, regardless of make, with a universal writing platform that can be secured any place of firm surface for operator or passenger use;

(b) to provide a ready accessible writing platform for automobiles, aircraft, boats, military and all emergency vehicles;

(c) to provide a platform that puts the writing pad in close proximity to the operator of vehicle;

(d) to provide a practical solid writing platform to use safely;

(e) to provide a convenient, comfortable writing platform to simulate office within a vehicle;

(f) to provide a portable writing platform that may be quickly removed to use portably;

(g) to provide a portable writing platform that can be installed and removed without removing or defacing vehicle interior trim;

(h) to provide a writing platform that will use the transference of energy to secure and support the load of its function;

(i) to provide a vehicle owner with a creative, inexpensive writing platform;

(j) to provide a high quality writing platform that conforms within a vehicle;

(k) to provide a writing platform with sizable writing space and affording hand comfort;

(l) the stability, appearance and adaptability of my writing platform makes it much needed.

BRIEF DESCRIPTION OF THE DRAWINGS

FIG. 3 shows bottom edge view of writing platform.

FIG. 4 shows top edge view of writing platform.

FIG. 5 shows left side edge view of writing platform.

FIG. 6 shows right side edge view of writing platform.

FIG. 7 is a profile view of writing platform in work position.

FIG. 8 is a view of affixed writing platform related to driver and vehicle interior.

REFERENCE NUMERALS IN DRAWINGS

Figure 1:
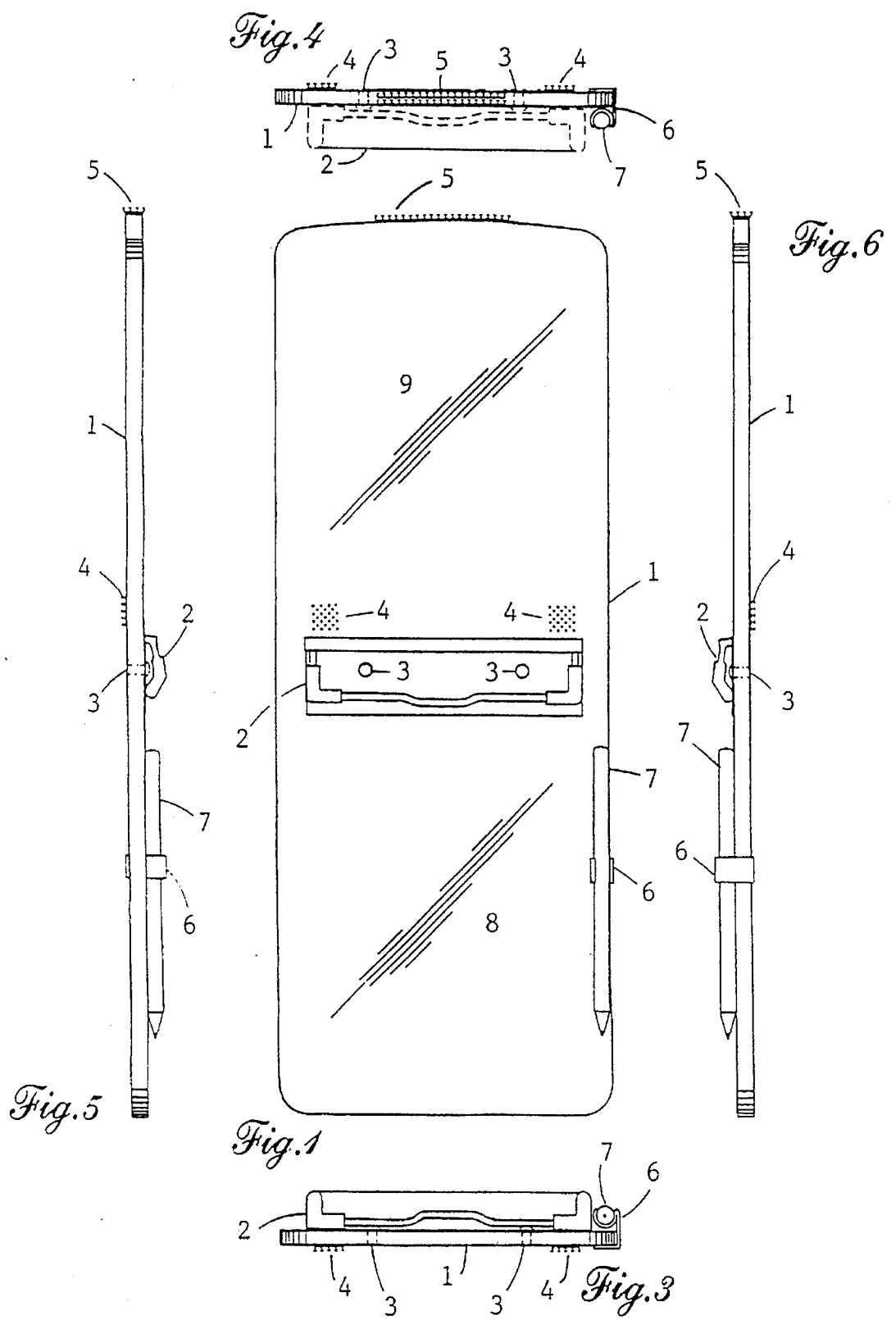
FIG. 1 shows front view of writing platform.

1. Portable writing platform
2. Spring clamp paper pad retainer
3. Rivet fasteners
4. Square hook fasteners
5. Strip hook fasteners
6. Pen/pencil retainer clip

7. Pen/pencil
8. Base
9. Neck
10. Square loop fasteners
11. Vehicle dashboard
12. Strip loop fasteners
13. Vehicle hood
14. Vehicle windshield
15. Vehicle steering wheel
16. Paper pad

DESCRIPTIONS OF THE INVENTION

A typical embodiment of closure of this present invention is illustrated in the following:

FIG. 1 shows a front view of platform (1). Spring clamp paper pad retainer (2) is situated approximately midway between top and bottom edges of platform (1). Rivet fasteners (3) hold spring clamp paper pad retainer (2) onto platform (1). Two square hook fasteners (4) are adhered with manufacturer's precoated adhesive backing to back of platform (1). One strip hook fastener (5) is adhered with adhesive backing to top edge of platform (1). Pen/pencil retainer clip (6) is clipped to lower right side of platform (1) holding pen/pencil (7). BASE (8) writing area is lower half of platform's (1) front surface. NECK (9) area is upper half of platform's (1) front surface.

Figure 2:
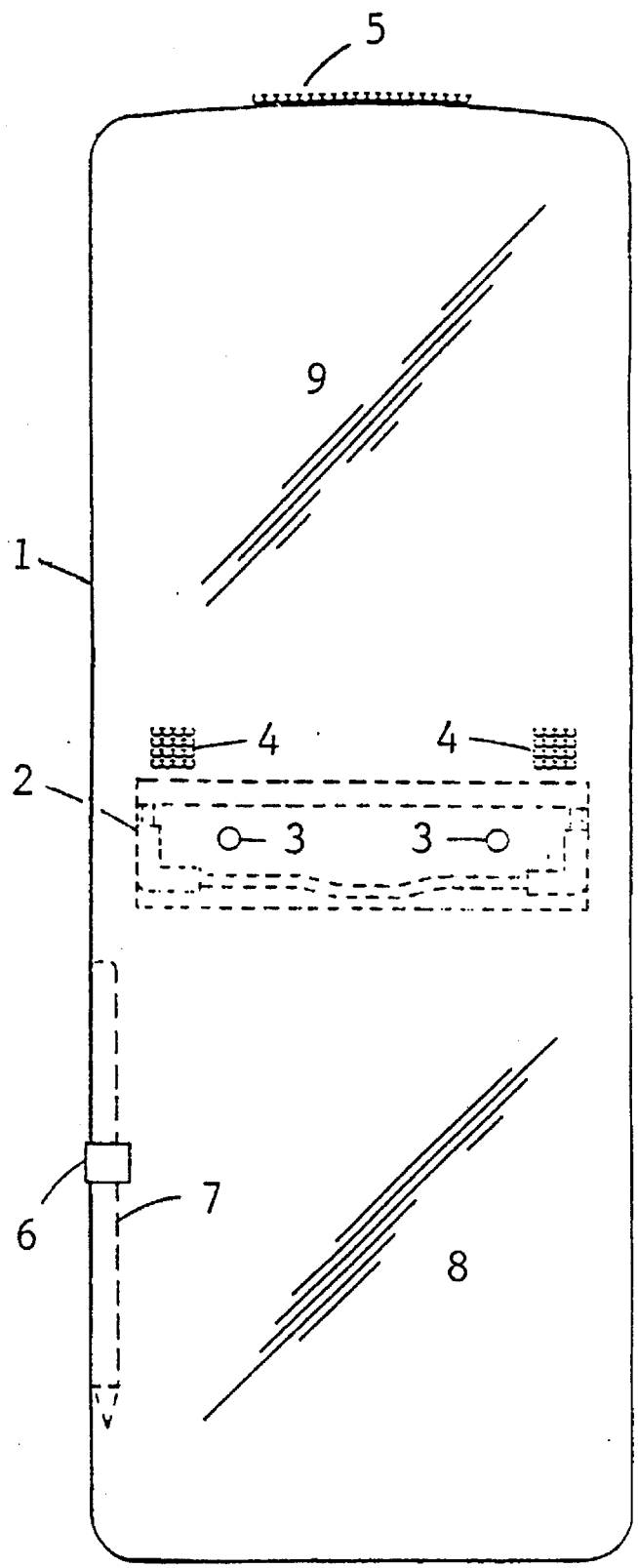
FIG. 2 shows back view of writing platform.

FIG. 2 shows a back view of platform (1) showing square hook fasteners (4) in place. Two rivets (3) penetrate platform (1) in two predrilled holes holding spring clamp paper pad retainer (2) on top side of platform (1). Strip hook fastener (5) is a mirror view of FIG. 1. Pen/pencil retainer clip (6) is showing a base footing to retain position on platform (1). Pen/pencil (7) is within retainer clip (6) showing through back side of platform (1). BASE (8) is back side, lower half of writing area on platform (1). NECK (9) is back side of upper half of platform (1).

FIG. 3 shows a bottom edge view of platform (1) shows elevation of spring clamp paper pad retainer (2). Thickness of platform (1) is shown to be substantial and ridged. Rivets (3) are holding spring clamp paper pad retainer (2) to platform (1). Pen/pencil retainer clip (6) holding pen/pencil (7) shown on end illustrates configuration. Square hook fasteners (4) shown in profile, expose the open hook structure.

FIG. 4 shows a top edge view of platform (1) shows elevation of top side of spring clamp paper pad retainer (2). Strip hook fastener (5) is shown adhered to top edge of platform (1). Rivets (3) are holding spring clamp paper pad holder (2) to platform (1). Square hook fasteners (4) are in place. Pen/pencil (7) in retainer clip (6) is pressure retained on body of platform (1).

FIG. 5 shows a left side edge view shows profile of platform (1) and spring clamp paper pad retainer (2). Pen/pencil (7) is secured in pen/pencil retainer clip (6). Rivet fasteners (3) are shown holding spring clamp paper pad retainer (2) onto platform (1). Square hook fasteners (4) are shown in profile as well as strip hook fastener (5).

FIG. 6 shows a right side edge view is a mirror view of FIG. 5 with exception to pen/pencil retainer clip (6). Pen/pencil retainer clip (6) in FIG. 5 shows interstructure straddling platform (1) and in FIG. 6 the pen/pencil retainer clip (6) shows outerstructure straddling platform (1) while holding pen/pencil (7).

FIG. 7 shows a left side edge view in use position shows platform (1) on contact point of dashboard (11). The profile dashboard (11) is supporting midsection of platform (1). The profile of windshield (14) is abutting top edge of platform (1) with strip loop fastener (12) abutting and engaged with strip hook fastener (5). The profile of vehicle hood (13) is shown. Upper half of platform (1) known as the NECK (9) contacts dashboard (11) and windshield (14). The approximate MIDSECTION of platform (1) makes contact with high point on dashboard (11) giving platform (1) central support. The square hook fasteners (4) on the platform (1) and the square loop fasteners (10) on the dashboard (11) are engaged in axial alignment. The paper pad (16) and pen/pencil (7) are not shown in an effort to clearly illustrate the basic writing platform (1) in position.

FIG. 8 shows a perspective view of affixed writing platform (1) in very close proximity to operator of vehicle, illustrates interior of vehicle showing dashboard (11), steering wheel (15) and windshield (14). The paper pad (16) and pen/pencil (7) are in place.

MODEL OF OPERATION

Portable writing platform (1) will come with two square hook fasteners (4), two square loop fasteners (10), one strip hook fastener (5) and one strip loop fastener (12) all with adhesive backing. Strip hook fastener (5) and strip loop fastener (12) will be used for top edge of platform (1) and windshield (14) respectively. Two square hook fasteners (4) and two square loop fasteners (10) will be affixed to BACK of platform (1) and dashboard (11) high contact points respectively.

When location of writing platform (1) is decided by vehicle operator for his most comfortable writing position, he will mark three contact points:

platform (1) two bottom points or continuous line touching dashboard (11) and top edge of platform (1) to lower margin area of windshield (14). Two square loop fasteners (10) are adhered to the marked contact points on dashboard (11). Two square hook fasteners (4) are axial alligned to the two square loop fasteners (10) on dashboard (11) and adhered to back of platform (1). Adhesive backed strip hook fastener (5) is adhered to top edge of platform (1) to abut and engage strip loop fastener (12) on lower margin area of inner surface of windshield (14). Platform (1) is aligned with matching square hook fasteners (4) on dashboard (11) and square loop fasteners (10) on back of platform (1). Strip hook fastener (5) and strip loop fastener (12) are then engaged. Platform (1) is secured with firm downward pressure on front writing surface (8). Platform (1) is now locked on dashboard (11) laterally and abutted on the rake of the inner surface of windshield (14). When hand weight and writing pressure are applied on paper pad (16), pressure on the rake abutment of the inner surface of windshield (14) locks writing platform (1) even more securely. The dashboard (11) serves as a fulcrum. The BASE of platform (8) is the load. The NECK (9) of platform is the leverage lock.

Although the description above contains many specificities, these should not be construed as limiting the scope of the invention but merely providing illustrations of some presently preferred embodiments of this invention.

I claim:

1. A device for mounting a note pad in a vehicle having a windshield and a dashboard, said device comprising:

an elongated base having a front end, a back end, a top surface defining a writing area, and a bottom surface;

clamp means on said base top surface for removable retaining said note pad against said top surface writing area;

first fastener means attached to the base bottom surface and the dashboard for securing the base to the dashboard;

second fastener means attached to the base back end and the windshield; wherein when pressure is applied to said writing area the base pivots from a first position in which the base back end is substantially parallel to a plane defined by said dashboard to a second position where the base back end is wedge between said dashboard and said windshield and is held in a locking position by said second fastener means.

2. The pad holder recited in claim 1 wherein the clamp means is a spring clamp.

3. The pad holder recited in claim 1 wherein the top surface further has a clip means for holding a writing utensil.

4. The pad holder recited in claim 1 wherein said first and second fastener means are hook and loop fastener.

5. The pad holder recited in claim 1 wherein the base pivots around a point where the base is secured to the dashboard.

\* \* \* \* \*